United States Patent [19]
Stedman

[11] 3,954,194
[45] May 4, 1976

[54] MATERIAL GRASPING APPARATUS
[75] Inventor: Robert N. Stedman, Chillicothe, Ill.
[73] Assignee: Caterpillar Tractor Co., Peoria, Ill.
[22] Filed: Oct. 15, 1974
[21] Appl. No.: 514,503

[52] U.S. Cl. .............................. 214/75 H; 214/518; 294/99 R; 294/106
[51] Int. Cl.² ...................... B60P 1/54; B66C 1/00
[58] Field of Search ................ 294/99 R, 99 SA, 88, 294/106; 214/302, 518, 147 G, 75 H

[56] References Cited
UNITED STATES PATENTS

| | | | |
|---|---|---|---|
| 2,862,756 | 12/1958 | Larson | 294/88 |
| 2,956,700 | 10/1960 | Quayle | 294/99 R |
| 3,370,879 | 2/1968 | Green et al. | 294/99 R |
| 3,730,367 | 5/1973 | Heffington | 214/518 |
| 3,762,586 | 10/1973 | Updike, Jr. | 214/302 |

Primary Examiner—Robert J. Spar
Assistant Examiner—Lawrence J. Oresky
Attorney, Agent, or Firm—Wegner, Stellman, McCord, Wiles & Wood

[57] ABSTRACT

An improved material grasping apparatus such as a grapple especially adapted for grasping and moving irregularly shaped, fragile material such as refuse packed in plastic bags or the like. The grapple includes a pair of jaws pivotally connected to each other and each having confronting material receiving cavities. Each jaw has spaced, rigid end members and a flexible, deformable material engaging element extending between and connected to the end members to at least partially close the respective material receiving cavity. Each such element is substantially unbacked whereby it may deform to the shape of a fragile, irregularly shaped object when the jaws are closed thereon. The invention contemplates the provision of a power source for opening and closing the jaws as well as mounting of the grapple on a boom which, in turn, is mounted on a refuse collecting truck.

10 Claims, 6 Drawing Figures

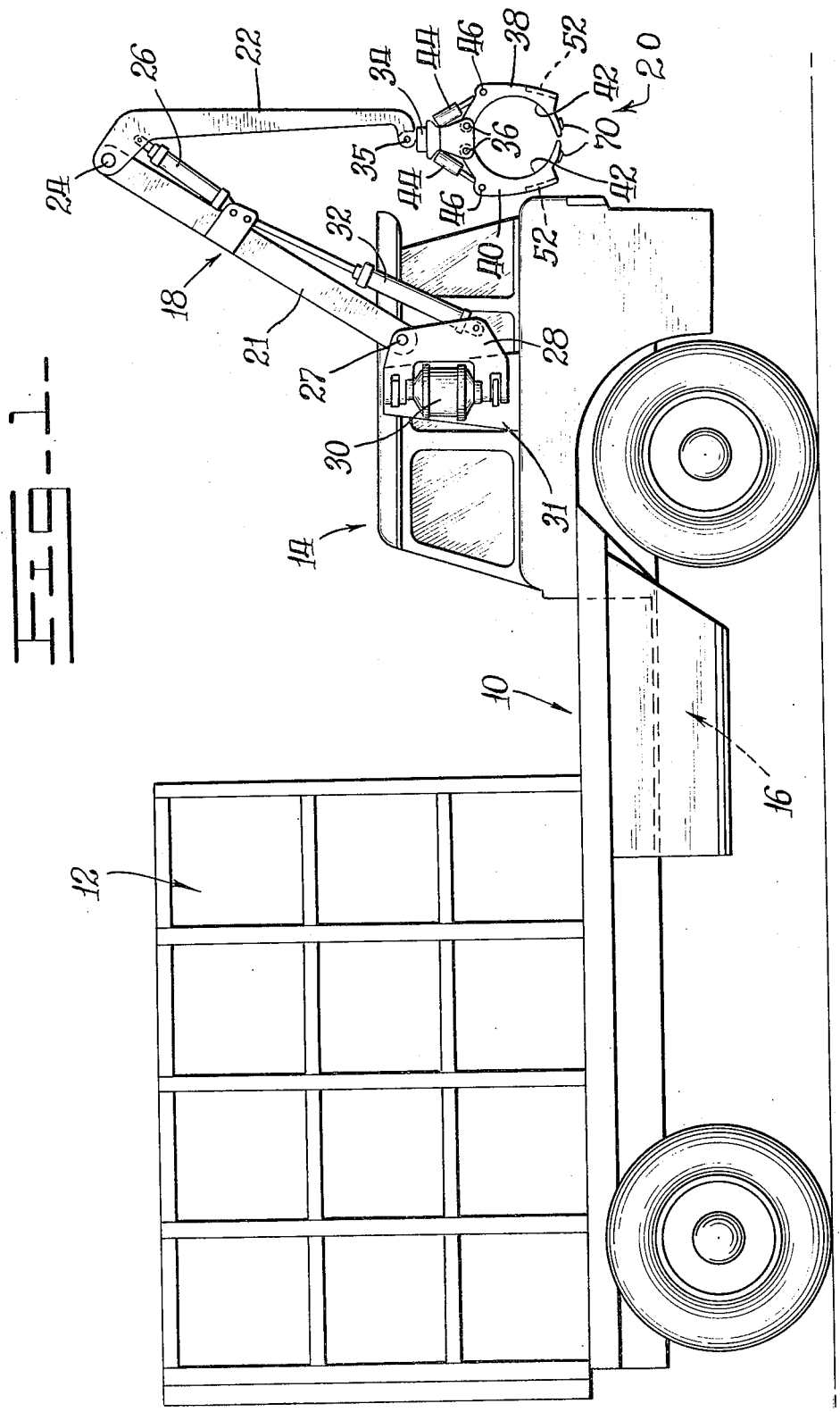

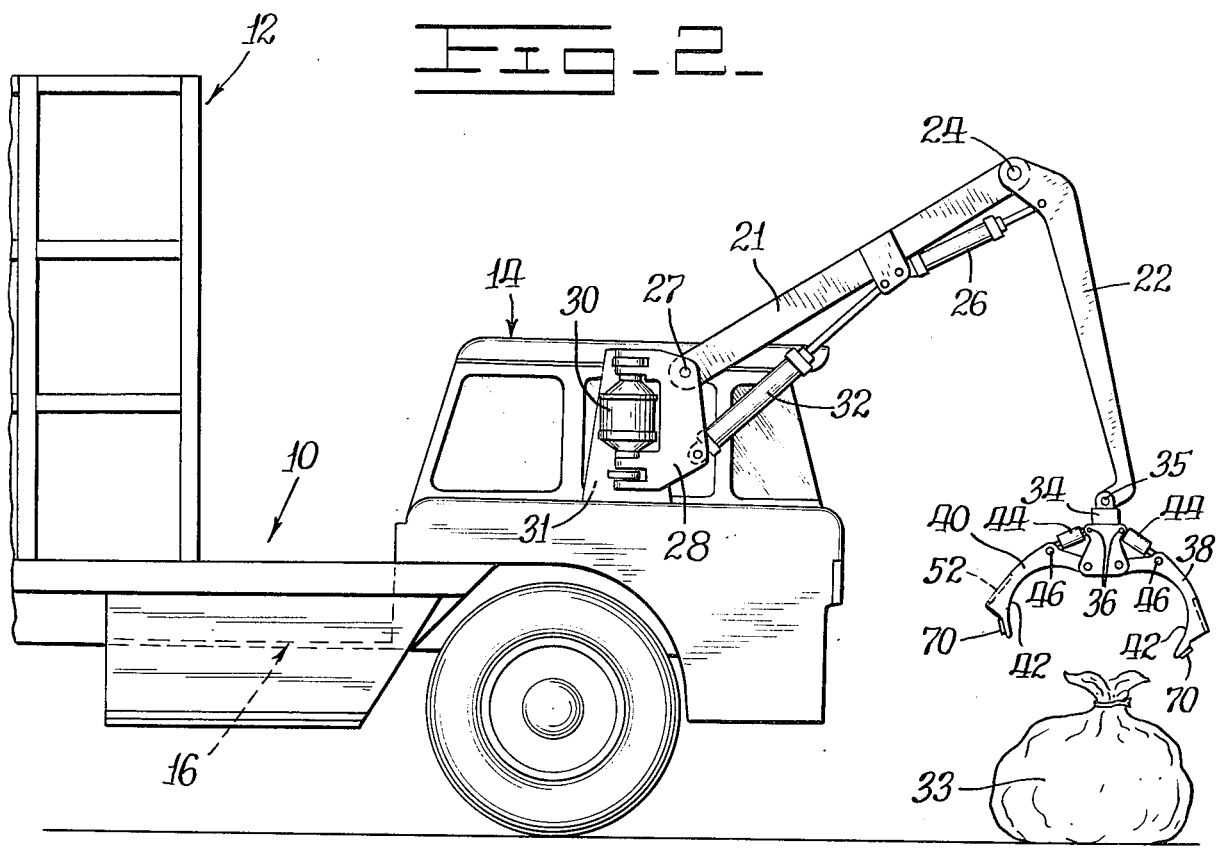
Fig_2_
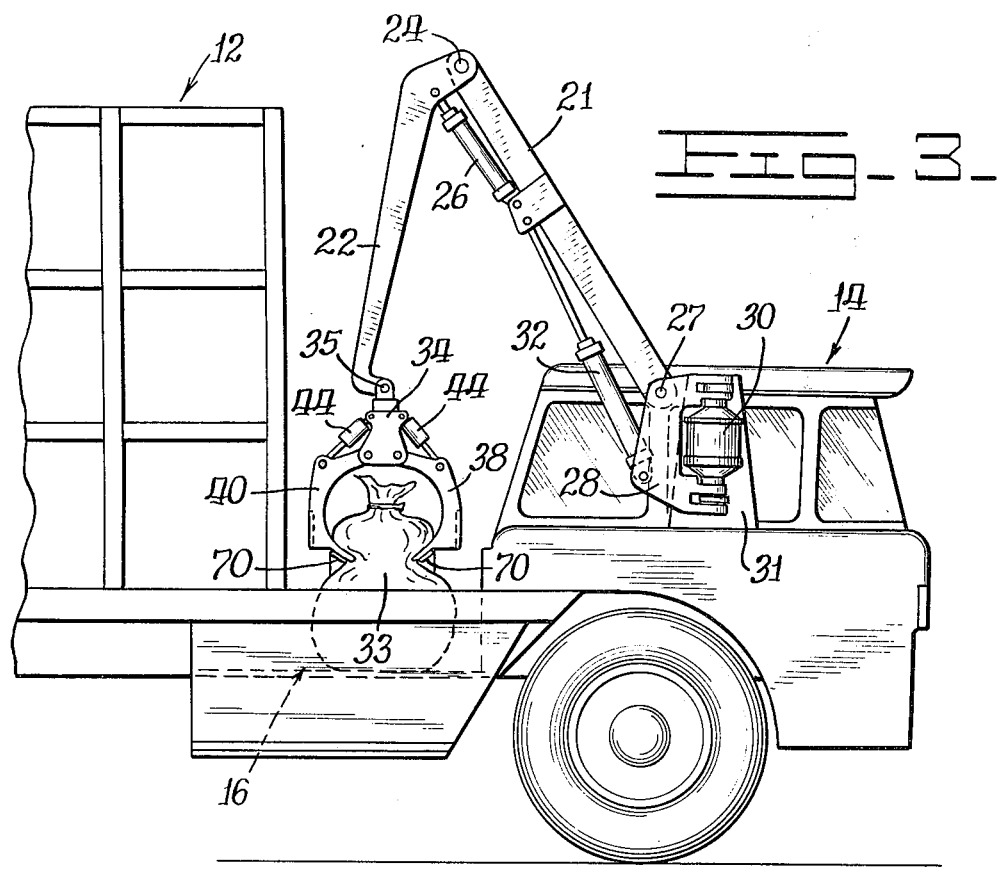
Fig_3_

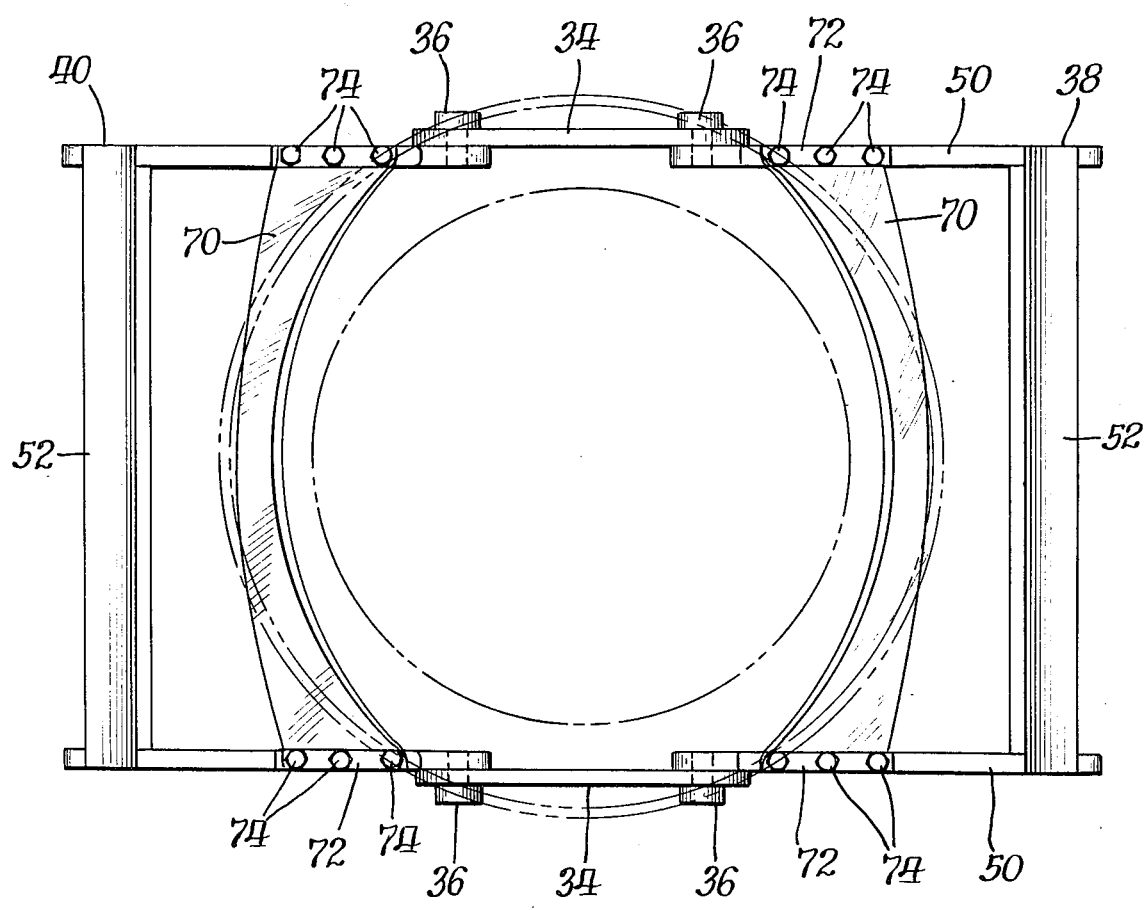

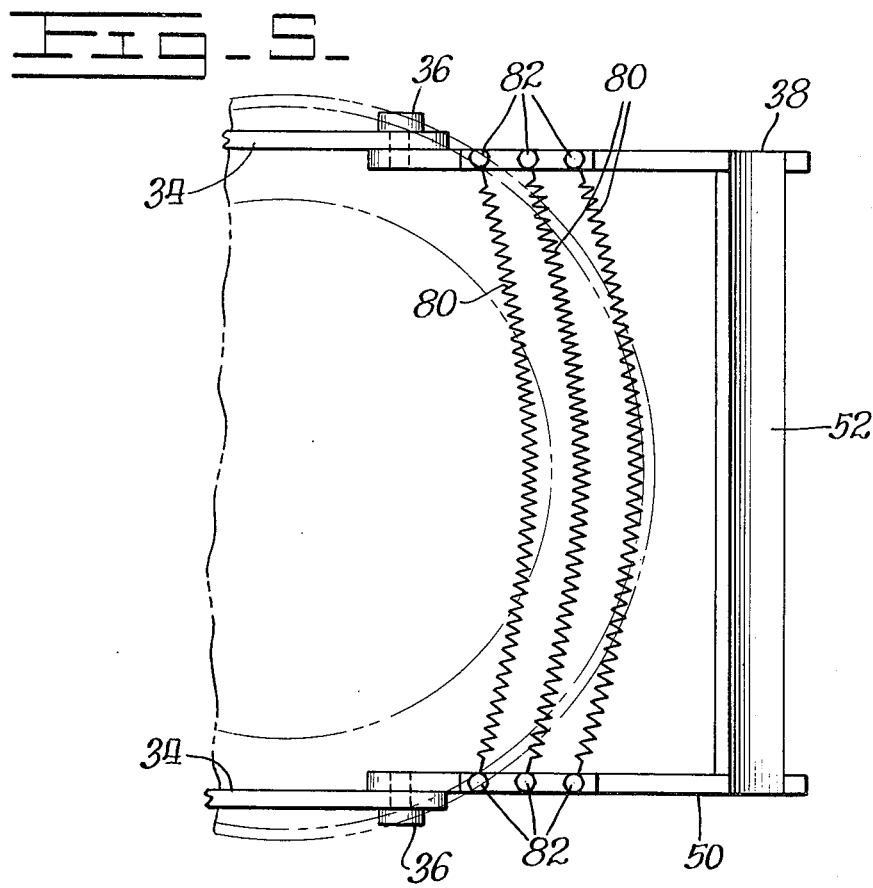
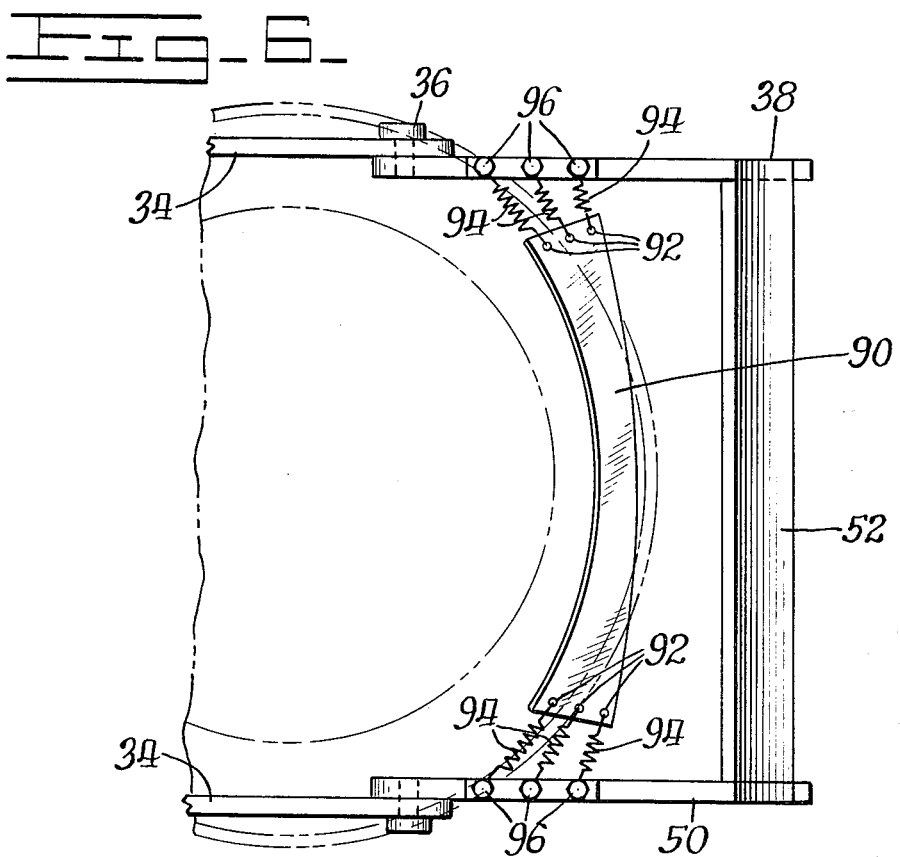

MATERIAL GRASPING APPARATUS

BACKGROUND OF THE INVENTION

This invention relates to a material grasping apparatus such as a grapple. More specifically, the invention relates to such an apparatus that is especially adapted for grasping and moving irregularly shaped, fragile material such as refuse.

The most pertinent prior art known to the applicant includes U.S. Pat. Nos. 2,862,756 to Larson; 3,730,367 to Heffington; 3,815,765 to Moser et al; 3,038,620 to Collin; 3,446,377 to Heinert; 3,447,705 to Stone; and 3,516,562 to Knight.

Refuse collection is becoming progressively more costly by reason of the manual labor involved and the ever-increasing cost of labor. Not untypically, refuse collecting trucks are provided with crews of two or three members to pick up refuse from its place of repose and move the same to a refuse receiving opening on the vehicle.

Where attempts have been made to minimize the number of laborers employed, the process becomes inefficient since such minimization efforts typically require that the driver of the vehicle periodically exit the vehicle to assist in the refuse pickup operation. Thus, it is virtually impossible to efficiently collect refuse employing but a single laborer who is also required to operate the vehicle and move the same from location to location during the pickup process.

SUMMARY OF THE INVENTION

It is the principal object of the invention to provide a new and improved material grasping apparatus especially adapted for grasping and moving irregularly shaped, fragile material, such as refuse in plastic bags, from a place of repose to a collection space such as is typically found on a refuse collecting vehicle. It is also an object of the invention to provide a new and improved refuse collecting vehicle embodying such a material grasping apparatus wherein a single laborer, employed principally to drive the vehicle, may collect refuse without the need for leaving the vehicle.

An exemplary embodiment of the invention achieves the foregoing object in a structure including a pair of jaws pivotally connected to each other and having confronting concave material receiving cavities. Each jaw has spaced, generally parallel, rigid end members. A flexible, deformable, resilient material engaging element extends between and is connected to the end members to at least partially close the respective material receiving cavity. Each such element is substantially unbacked so that it may deform to the shape of a fragile, irregularly shaped object such as a plastic bag filled with refuse when the jaws are closed on such an object. A powered device is employed for selectively opening and closing the jaws.

According to one embodiment of the invention, each such element comprises at least one band elastomeric material.

According to another embodiment of the invention, each such element comprises a plurality of springs.

According to still a further embodiment of the invention, each such element comprises a flexible, but non-elastic strap and springs interconnecting the strap and the end members of the jaws.

When employed for refuse collecting, the material grasping apparatus is mounted on the end of a boom which, in turn, is mounted on the frame of a refuse collecting vehicle having a refuse receiving cavity. Powered means are provided for the boom to manipulate the boom so that the material grasping apparatus may grasp material and move the same to the refuse receiving cavity.

Other objects and advantages will become apparent from the following specification taken in conjunction with the accompanying drawings.

DESCRIPTION OF THE DRAWINGS

FIG. 1 is a side elevation of a refuse collecting vehicle embodying the invention;

FIG. 2 is a fragmentary side elevation of the vehicle illustrating the position of the material grasping apparatus of the invention with respect to the refuse container about to be grasped;

FIG. 3 is a fragmentary side elevation of the vehicle illustrating the release of the refuse container into a refuse receiving cavity on a vehicle frame;

FIG. 4 is a view of one embodiment of a material grasping means from the bottom thereof;

FIG. 5 is a fragmentary view of still another embodiment of the grasping apparatus; and FIG. 6 is a fragmentary view of still a further embodiment of the material grasping apparatus.

DESCRIPTION OF THE PREFERRED EMBODIMENTS

An exemplary embodiment of a material grasping apparatus in combination with a refuse collecting vehicle is illustrated in FIG. 1. There is provided a vehicle, generally designated 10, having a body, generally designated 12, housing a refuse receiving cavity. The vehicle 10 also includes an operator cab 14 and a refuse receiving hopper-like structure, generally designated 16. If desired, the body may receive compacting apparatus and a means is provided in connection with the hopper 16 for driving refuse received therein into the body 12. For further details of a preferred structure, reference may be had to the commonly assigned, previously identified, U.S. Patent 3,815,765 to Moser et al, the details of which are herein incorporated by reference.

The vehicle 10 mounts, adjacent the operator cab 14, a boom, generally designated 18, which in turn mounts a material grasping apparatus, generally designated 20, made according to the invention and in the form of a grapple.

The boom 18 includes relatively pivotal and extendable members 21 and 22 interconnected by a pivot 24 and a selectively operable hydraulic cylinder 26 whereby relative movement between the boom members 21 and 22 can be achieved. The boom element 21 is pivotally connected by a pin 27 to a yoke-like element 28 which is, in turn, connected to a swing motor 30, which is mounted on an upstanding frame member 31 of the vehicle 10. For further details of the interrelationship between the yoke 28, the swing motor 30 and the plate 31, reference may be had to the commonly assigned U.S. Pat. No. 3,758,941 to Jackson et al, the detals of which are herein incorporated by reference.

A further hydraulic cylinder 32 is interposed between the yoke 28 and the boom element 21 so that its attitude relative to the yoke 28 may be selectively varied.

As a result of the foregoing, it will be seen that the material grasping apparatus 20 can be moved from a transport position such as that shown in FIG. 1, which will be one of many positions that can be assumed while the vehicle is in transit although, more preferably, the boom would be swung around so as to locate the material grasping apparatus 20 over the hopper 16 to a position such as that shown in FIG. 2 whereat a package of refuse 33 is about to be grasped to a position such as shown in FIG. 3 wherein the package of refuse is being deposited in the hopper 16 for subsequent movement into the body 12. Through the provision of suitable controls for the various cylinders within the operator cab 14, the foregoing operations can all take place without requiring the operator to leave the cab. Consequently, in a refuse collecting vehicle made according to the invention, there is only a need for the presence of one laborer and yet efficiency is maximized by reason of the fact that the laborer need not leave the operator cab 14 during the process of collecting refuse.

Of substantial importance to the success of a refuse collecting vehicle made according to the invention is the construction of the material grasping means 20. The same includes a coupling member 34 attached by a pivot pin 35 to the boom member 22 so as to depend therefrom under the influence of gravity. By means of pivot pins 36 in the coupling 34, first and second jaws 38 and 40 are pivotally mounted with respect to each other. Each has a material receiving cavity 42 and the arrangement is such that the cavities 42 of the jaws 38 and 40 confront each other.

The material grasping apparatus 20 further includes a pair of hydraulic cylinders 44 which are pivotally connected to the coupling 34 by means not shown, as well as by pivot pins 46 to respective ones of the jaws 38 and 40. Thus, through selective actuation of the cylinders 44, the jaws 38 and 40 can be moved between open and closed positions, i.e., from the open position shown in FIG. 2 to the closed position shown in FIG. 1 or to any intermediate positions such as the partially closed position illustrated in FIG. 3.

Turning now to FIGS. 1 and 4, each of the jaws 38 and 40 is formed by two, spaced end members 50 which are somewhat half-moon shaped as seen in FIG. 1. Intermediate their length, each of the end members 50 is interconnected by a rigid bar 52 solely for rigidification purposes. As seen in FIG. 1, near their toes or their point of abutment when in the closed position, each is provided with a flexible, resilient, deformable retaining element 70.

Returning now to FIG. 4, the element 70 is seen to comprise at least one band of elastomeric material, as for example, rubber, having its ends sandwiched against the two end members 50 by mounting plates 72 and secured in place by bolts 74.

As a result of the foregoing construction, it will be appreciated that the band 70 partially closes the material receiving cavities of the material grasping apparatus 20 so as to permit the retention of material to be grasped therein. Moreover, because the same is deformable and resilient, it may deform to positions such as that shown in FIG. 4 when a package of refuse such as that shown in dotted lines in FIG. 4 is grasped. This is a particularly necessary feature in refuse collection. As is well known, refuse is frequently wrapped in plastic bags or the like and, depending upon the size of the bag and the amount of refuse therein, is irregularly shaped. Through the provision of the resilient element 70, the same can provide adequate grasping force to grasp a package of refuse so as to allow the same to be moved to the hopper 16 and yet not rupture the typical plastic container.

FIG. 5 illustrates another embodiment of the invention wherein in lieu of the elastomeric band 70, a plurality of metal springs 80 are secured as by bolts 82 to the end members 50 of each of the jaws. The springs 80 will deform in the same manner as the band 70 to allow fragile, irregularly shaped objects, such as refuse packed in plastic bags, to be grasped without breaking.

FIG. 6 shows still a further embodiment of the invention. In the embodiment shown in FIG. 6, a flexible but non-elastic strap 90, which may be formed of canvas or the like, is employed in lieu of the band 70 or the springs 80. To provide the requisite resiliency, opposite ends of the strap 90 are provided with a series of eyelets 92 for connection to springs 94 of relatively short length. The springs 94 are, in turn, secured to corresponding ones of the end members 50 by means of bolts 96.

From the foregoing, it will be appreciated that by reason of the unbacked nature of the grasping elements 70, 80 or 90 coupled with the resiliency in the overall connection, an improved material grasping apparatus is provided that is especially adapted for use in refuse collection.

I claim:

1. Material grasping apparatus especially adapted for grasping and moving irregularly shaped, fragile material, comprising the combination of:
    a pair of jaws pivotally connected to each other and having confronting concave material receiving cavities, each said jaw having spaced, rigid end members and a flexible, deformable, resilient material engaging element extending between and connected to said end members to at least partially close the respective material receiving cavity, each said element being substantially unbacked whereby said elements may deform to the shape of a fragile, irregularly shaped object when said jaws are closed thereon; and
    power means for selectively opening and closing said jaws.

2. The material grasping apparatus of claim 1 wherein each said element comprises at least one band of elastomeric material.

3. The material grasping apparatus of claim 1 wherein each said element comprises a plurality of springs.

4. The material grasping apparatus of claim 1 wherein each said element comprises a flexible, non-elastic strap, and spring means interconnecting said strap and said end members.

5. A refuse collecting vehicle incorporating the material grasping apparatus of claim 1 including a vehicle frame having a refuse receiving cavity; a boom mounted on said frame; said material grasping apparatus of claim 1 being mounted on said boom; and further power means for said boom for moving said boom so that said material grasping apparatus may grasp material and move the same to said refuse receiving cavity.

6. The material grasping apparatus of claim 5 wherein each said element comprises at least one band of elastomeric material.

7. The refuse collecting vehicle of claim 5 wherein each said end member is half moon shaped, and has one end pivotally connected to the other of said jaws; each said material engaging element being secured to the associated end members near the ends thereof opposite said one end.

8. The material grasping apparatus of claim 7 wherein each said element comprises at least one band of elastomeric material.

9. The material grasping apparatus of claim 7 wherein each said element comprises a plurality of springs.

10. The material grasping apparatus of claim 7 wherein each said element comprises a flexible, non-elastic strap, and spring means interconnecting said strap and said end members.

* * * * *